United States Patent
Chen et al.

(10) Patent No.: US 9,999,045 B2
(45) Date of Patent: Jun. 12, 2018

(54) MANAGEMENT METHOD FOR WIRELESS NETWORK AND NETWORK MANAGEMENT NODE

(71) Applicant: INDUSTRIAL TECHNOLOGY RESEARCH INSTITUTE, Hsinchu (TW)

(72) Inventors: Ming-Che Chen, Taichung (TW); Yung-Ching Huang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 227 days.

(21) Appl. No.: 14/977,217

(22) Filed: Dec. 21, 2015

(65) Prior Publication Data
US 2017/0118752 A1 Apr. 27, 2017

(30) Foreign Application Priority Data
Oct. 27, 2015 (TW) .............................. 104135213 A

(51) Int. Cl.
H04W 72/04 (2009.01)
H04L 12/24 (2006.01)
G06Q 30/00 (2012.01)
H04W 24/00 (2009.01)

(52) U.S. Cl.
CPC ........ *H04W 72/0446* (2013.01); *G06Q 30/00* (2013.01); *H04L 41/12* (2013.01); *H04W 24/00* (2013.01)

(58) Field of Classification Search
CPC .. H04L 41/12; H04W 24/00; H04W 72/0446; H04W 72/044; G06Q 30/00
See application file for complete search history.

(56) References Cited

U.S. PATENT DOCUMENTS

| 7,343,170 B1 | 3/2008 | Feeney et al. |
| 7,924,766 B2 | 4/2011 | Sahinoglu et al. |
| 8,248,989 B2 | 8/2012 | Jeong et al. |

(Continued)

FOREIGN PATENT DOCUMENTS

| CN | 102118832 B | 9/2013 |
| TW | I445425 B | 7/2014 |
| TW | I446753 B | 7/2014 |

OTHER PUBLICATIONS

Deguglielmo et al. "A Performance Analysis of the Network Formation Process in IEEE 802.15.4e TSCH Wireless Sensor/Actuator Networks," 2014 IEEE Symposium on Computers and Communications (ISCC), Jun. 2014, 6 pages.

(Continued)

*Primary Examiner* — Paul H Masur
(74) *Attorney, Agent, or Firm* — Birch, Stewart, Kolasch & Birch, LLP

(57) ABSTRACT

A wireless network management method for a wireless network is provided. A length parameter of a slotframe is evaluated by considering an advertisement requirement and/or a data transmission requirement of the wireless network. The length parameter of the slotframe is adjusted to be relatively prime to a total number of available channels. At least one timeslot within the slotframe is assigned for matching the advertisement and/or the data transmission requirements, and the timeslot assignment of the slotframe is advertised.

14 Claims, 3 Drawing Sheets

| CH-OFFSET | | 0 | 1 | 2 | 3 | 4 | 5 | 6 | 7 | 8 |
|---|---|---|---|---|---|---|---|---|---|---|
| | #0 | A>ADV | A RX | B>ADV | B RX | B>A | C>B | B>A | D>A | |
| | #1 | | | | | | | | | |
| | #2 | | | | | D>ADV | D RX | | | |

(56) References Cited

U.S. PATENT DOCUMENTS

| | | | |
|---|---|---|---|
| 8,363,693 B2 | 1/2013 | Fujiwara | |
| 8,385,322 B2 | 2/2013 | Colling et al. | |
| 8,599,719 B1 | 12/2013 | Doherty | |
| 8,879,575 B2 | 11/2014 | Zhent et al. | |
| 8,948,229 B2 | 2/2015 | Hui et al. | |
| 2008/0260008 A1* | 10/2008 | Vrcelj | H04L 25/0216 375/149 |
| 2011/0255570 A1 | 10/2011 | Fujiwara | |
| 2012/0082130 A1* | 4/2012 | Xue | H04L 5/001 370/330 |
| 2013/0094481 A1 | 4/2013 | Jeong et al. | |
| 2014/0119408 A1 | 5/2014 | Huettinger et al. | |
| 2014/0153551 A1 | 6/2014 | Park et al. | |
| 2015/0023313 A1* | 1/2015 | Thubert | H04L 5/0055 370/330 |
| 2016/0020979 A1* | 1/2016 | Thubert | H04L 43/062 370/252 |

OTHER PUBLICATIONS

Du et al. "Adaptive Time Slotted Channel Hopping for Wireless Sensor Networks", Computer Science and Electronic Engineering Conference (CEEC), IEEE, 2012, pp. 29-34.

Guglielmo et al. "A Performance Analysis of the Network Formation Process in IEEE 802.15.4e TSCH Wireless Sensor/Actuator Networks", ISCC, 2014, 2014 IEEE Symposium on Computers and Communication (ISCC), 2014 IEEE Symposium on Computers and Communication (ISCC) 2014, pp. 1-6.

Palattella et al., "Standardized Protocol Stack for the Internet of (Important) Things", IEEE Communications Surveys & Tutorials, vol. 15. No. 3, Third Quarter 2013, pp. 1389-1406.

Watteyne et al. "OpenWSN: a standards-based low-power wireless development environment", Transactions on Emerging Telecommuncations Technologies, 2012 vol. 23, pp. 480-493.

* cited by examiner

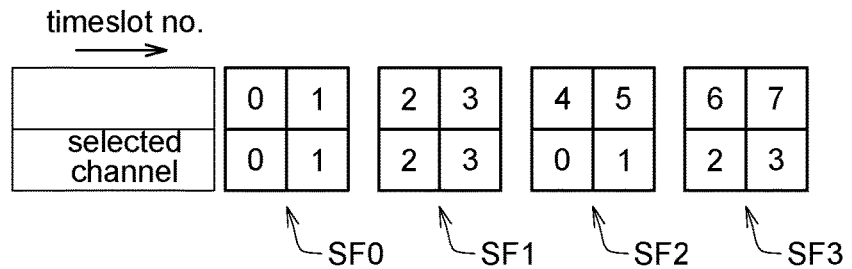
FIG. 4A
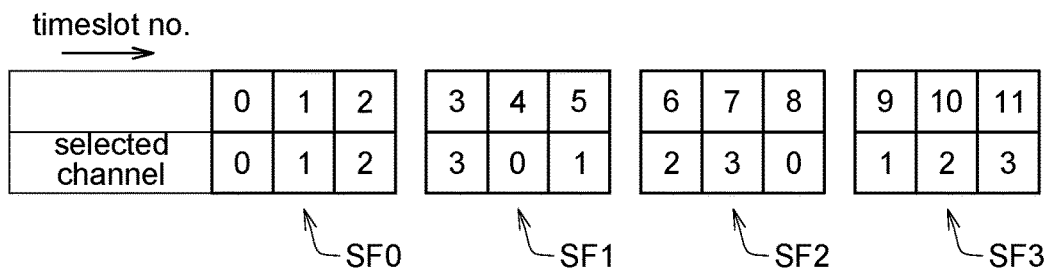
FIG. 4B
| | | 0 | 1 | 2 | 3 | 4 | 5 | 6 | 7 | 8 |
|---|---|---|---|---|---|---|---|---|---|---|
| CH-OFFSET | #0 | A>ADV | A RX | B>ADV | B RX | B>A | C>B | B>A | D>A | |
| | #1 | | | | | | | | | |
| | #2 | | | | | D>ADV | D RX | | | |
FIG. 5

US 9,999,045 B2

MANAGEMENT METHOD FOR WIRELESS NETWORK AND NETWORK MANAGEMENT NODE

CROSS-REFERENCE TO RELATED APPLICATION

This application claims the benefit of Taiwan application Serial No. 104135213, filed Oct. 27, 2015, the disclosure of which is incorporated by reference herein in its entirety.

TECHNICAL FIELD

The disclosure relates in general to a wireless network management method and a network management node.

BACKGROUND

Wireless sensing network system adopts time slotted channel hopping (TSCH) technology for transmitting packets in low power consumption and high reliability. In the wireless sensing networks adopting time slotted channel hopping technology, timeslot assignment in a slotframe is periodically advertised by a network management node and managed nodes and new nodes may be dynamically joined the wireless sensing network. Besides, the network management node assigns timeslots during which the managed nodes transmit data packets.

Therefore, it has become a task to provide a wireless network management method and a network management node which improve the efficiency of the wireless network.

SUMMARY

The disclosure is directed to a wireless network management method and a network management node, wherein a length of a slotframe is dynamically adjusted based on an advertisement requirement and/or a data transmission requirement.

According to one embodiment, a wireless network management method for a wireless network is provided. A length parameter of a slotframe is evaluated by considering an advertisement requirement and/or a data transmission requirement of the wireless network. The length parameter of the slotframe is adjusted to be relatively prime to a total number of available channels. At least one timeslot within the slotframe is assigned for matching the advertisement and/or the data transmission requirements, and the timeslot assignment of the slotframe is advertised.

According to another embodiment, a network management node for a wireless network is provided. The network management node includes a timeslot requirement calculation sub-module, a slotframe length adjustment sub-module and a timeslot assignment sub-module. The timeslot requirement calculation sub-module is for evaluating a length parameter of a slotframe by considering an advertisement requirement and/or a data transmission requirement of the wireless network. The slotframe length adjustment sub-module is for adjusting the length parameter of the slotframe to be relatively prime to a total number of available channels. The timeslot assignment sub-module is for assigning at least one timeslot within the slotframe for matching the advertisement requirement and/or the data transmission requirement, and advertising a timeslot assignment of the slotframe.

BRIEF DESCRIPTION OF THE DRAWINGS

FIG. 4A shows the situation that the length of the slotframe is not relatively prime to a total number of available channels.

FIG. 4B shows the situation that the length of the slotframe is relatively prime to a total number of available channels.

FIG. 5 shows a slotframe after adjustment according to an embodiment of the present disclosure.

Figure 1:
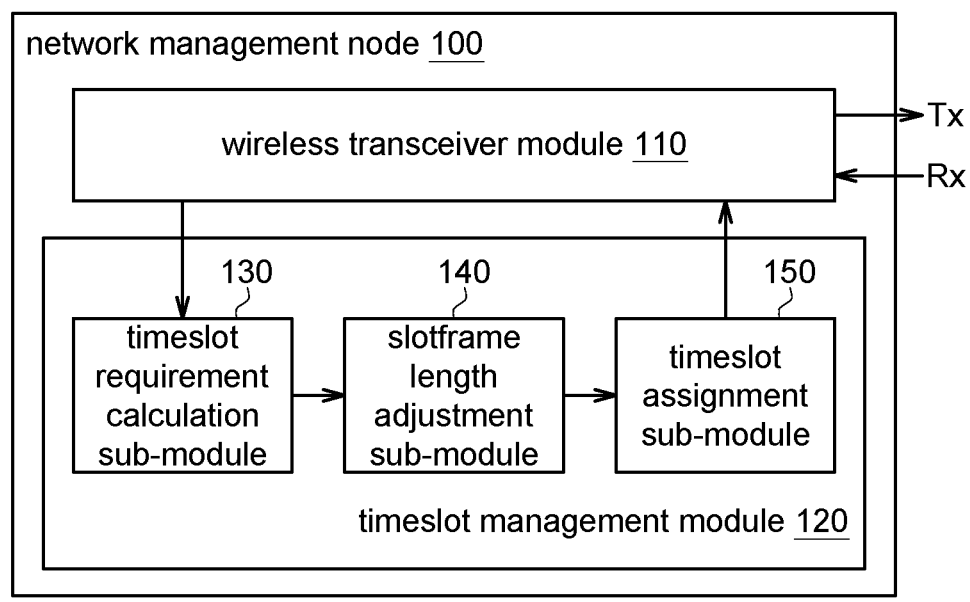
FIG. 1 shows a functional block of a network management node of a wireless network according to an embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a functional block of a network management node 100 of a wireless network according to an embodiment of the application. The network management node 100 includes a wireless transceiver module 110 and a timeslot management module 120. In an embodiment of the present disclosure, the wireless network, exemplarily but not restrictively, may be realized by a centralized time slotted channel hopping (TSCH) wireless network.

The wireless transceiver module 110 is for receiving and transmitting wireless signals. The wireless transceiver module 110 may receive wireless signals from an external source (such as a managed node) and further transmit the wireless signals. The wireless transceiver module 110 may be implemented by hardware.

The timeslot management module 120 is for managing and determining the assignment of timeslots in a slotframe. The timeslot management module 120 adjusts the length of the slotframe. In the following, the length of the slotframe refers to the number of the timeslots of the slotframe.

The timeslot management module 120 includes a timeslot requirement calculation sub-module 130, a slotframe length adjustment sub-module 140 and a timeslot assignment sub-module 150. The timeslot management module 120 and the sub-modules 130-150 may be implemented by hardware or software.

The timeslot requirement calculation sub-module 130 considers and/or calculates the advertisement requirement and/or the data transmission requirement. That is, the timeslot requirement calculation sub-module 130 determines the total advertisement requirement and/or the total data transmission requirement of all nodes (including the network management node 100 and the joined managed node). For example, in an embodiment of the application, at least one advertisement is assigned each node. For example, if the wireless network includes two nodes (the network management node 100 and a managed node joined into the wireless network), at least one advertisement timeslot and at least one receiving timeslot are assigned to each of the nodes. Thus, it needs at least total four timeslots (the advertisement timeslot and the receiving timeslot may be referred as an advertisement interval). Besides, based on information from each of the managed node, the network management node 100 calculates the data transmission requirement for each of the managed nodes. For example, if a managed node informs the network management node 100 that one data will be transmitted from the managed node to the network management node 100 in the slotframe, then in the slotframe, the network management node 100 assigns one data timeslot to the managed node for data transmission. In the above example, the advertisement requirement and/or the data transmission requirement needs 5 timeslots (two advertisement timeslots, two receiving timeslots and one data timeslot). Thus, the timeslot requirement calculation sub-module 130 determines that the slotframe includes 5 timeslots (that is, the length parameter of the slotframe is 5).

In the advertisement timeslot, the network management node 100 or the managed node been joined the wireless network send advertisement message. The advertisement message includes: a timeslot assignment relevant information, a time synchronization information and a channel-hopping table. Through the time synchronization information, the managed node is time synchronized with the network management node 100.

In the receiving timeslot, the network management node 100 "listens" to check whether there are any new nodes sending a join request for joining the wireless network. If the network management node 100 receives the join request and a data transmission requirement from a node, the network management node 100 joins the node to the wireless network and changes the timeslot assignment to assign the advertisement timeslot(s) and the receiving timeslot(s) for the newly-joined managed node. The advertisement timeslots and the receiving timeslots basically are paired with each other. That is, if an advertisement timeslot is assigned to the network management node or to the managed node, a corresponding receiving timeslot is assigned to the network management node or to the same managed node. The paired advertising timeslot and receiving timeslot are not sent by the same channel. Detailed description for assigning the channel for sending the advertisement timeslots and the receiving timeslots is disclosed below.

After the managed node receives the advertisement message, the managed node may perform time synchronization with the network management node 100. After the node requesting to join the wireless network receives the advertisement message (including: the timeslot assignment relevant information, the time synchronization information and the channel-hopping table) on the fixed channel, the node receiving the advertisement message performs time synchronization to obtain a timeslot number of the next timeslot (i.e. the receiving timeslot). The node requesting to join the wireless network may calculate the channel assigned for the receiving timeslot based on the channel hopping table and the channel hopping formula. The node requesting to join the wireless network may send the join request in the receiving timeslot on the selected channel. The network management node 100 calculates the channel assigned for the receiving timeslot based on the channel hopping table and the channel hopping formula, and listens to check whether the join request is sent on the selected channel. When the network management node 100 receives the join request, the network management node 100 joins the node to the wireless network. If a new node joins the wireless network, the network management node will update and advertise the timeslot assignment.

If there are two or more than two nodes requesting to join the wireless network, it is possible that these nodes may receive advertising messages in the same advertising timeslot and send back the join request through the same channel in the same next timeslot (i.e. the same receiving timeslot), hence causing response collision. The node requesting to join the wireless network may use Carrier Sense Multiple Access with Collision Avoidance (CSMA/CA) to monitor whether the selected channel is occupied and then decide whether to send data back by the selected channel. If the node requesting to join the wireless network confirms that the selected channel is already occupied by other nodes, then the node requesting to join the wireless network may wait for a randomly time interval (i.e. wait for a random number of timeslots) and then again listen for the advertising message through the fixed channel.

The slotframe length adjustment sub-module 140 adjusts the length parameter of the slotframe to be relative prime to a total number of the available channels. The slotframe length adjustment sub-module 140 decides whether to adjust the length parameter of the slotframe which is decided by the timeslot requirement calculation sub-module 130. In details, the slotframe length adjustment sub-module 140 decides whether the length parameter of the slotframe decided by the timeslot requirement calculation sub-module 130 is relatively prime to the total number of the available channels. The reasons are as follows. If the length parameter of the slotframe is not relatively prime to the total number of the available channels, the slotframe length adjustment sub-module 140 adjust the length parameter of the slotframe until the length parameter of the slotframe is relatively prime to the total number of the available channels.

The timeslot assignment sub-module 150 assigns the timeslots of the slotframe based on the adjusted length of the slotframe, to meet the advertisement requirement and/or the data transmission requirement, and advertises the timeslot assignment of the slotframe. That is, the timeslot assignment sub-module 150 assigns which timeslot(s) as the advertisement timeslot(s), which timeslot(s) as the receiving timeslot(s), which timeslot(s) as the data timeslot(s) and which timeslot(s) as the blank timeslot(s) (if necessary). In the following, the advertisement timeslot(s) and the receiving timeslot(s) may be referred as an advertisement interval, the data timeslot(s) may be referred as a data interval, and the blank timeslot(s) may be referred as a blank interval.

Figure 2:
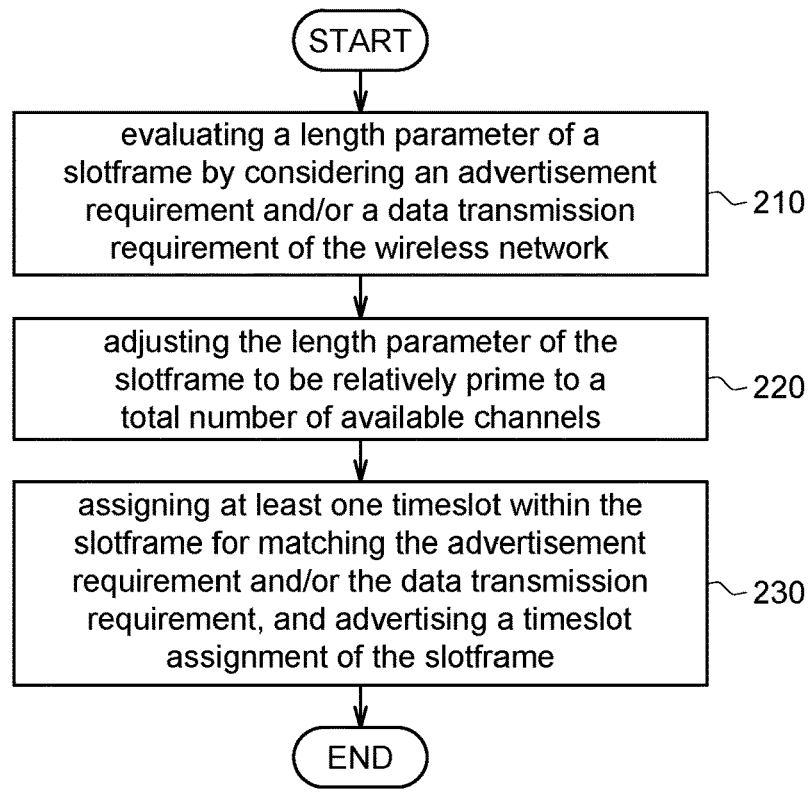
FIG. 2 shows a flowchart of a wireless network management method according to an embodiment of the present disclosure.

FIG. 2 shows a flowchart of a wireless network management method according to an embodiment of the present disclosure. In step 210, the length parameter of the slotframe is evaluated by considering an advertisement requirement and/or a data transmission requirement of the wireless network. The step 210 is for example executed by the timeslot requirement calculation sub-module 130. In step 220, the length parameter of the slotframe is adjusted to be relatively prime to a total number of available channels. The step 220 is for example executed by the slotframe length adjustment sub-module 140. In step 230, the timeslots within the slotframe are assigned for sufficing the advertisement and/or the data transmission requirements, and thereby the timeslot assignment of the slotframe is advertised. The timeslot assignment of the slotframe refers to that which timeslot(s) are assigned as the advertisement timeslot(s), which timeslot(s) are assigned as the receiving timeslot(s), and which timeslot(s) are assigned as the data timeslot(s). That is, the timeslot assignment of the slotframe refers to the assignment of the plurality of the timeslots of the slotframe. The step 230 is for example executed by the timeslot assignment sub-module 150.

How to adjust the length of the slotframe in the embodiment of the application is described with reference to the drawings.

Figure 3:
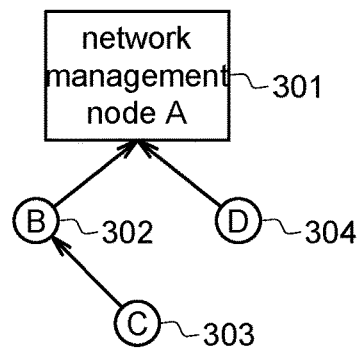
FIG. 3 shows an example of the wireless network.

FIG. 3 shows an example of the wireless network. The wireless network includes the network management node (A) 301 and the managed nodes (B)-(D) 302-304. The structure of the network management node (A) 301 is illustrated in FIG. 1. The managed nodes (B)-(D) 302-304, which may be realized by wireless network nodes such as wireless sensors, receive an advertising message from the network management node (A) 301 or other managed nodes to join the wireless network. As shown in FIG. 3, the managed nodes (B) 302 is a relay node which sends data from the managed nodes (C) 303 to the network management node (A) 301.

In the embodiment of the application, the nodes requesting to join the wireless network (for example, the managed nodes (B)-(C) 302-303) receive the advertisement message from the network management node (A) 301 on a fixed channel.

In the embodiment of the application, how to adjust the length of the slotframe in the initial state of the wireless network (including the network management node (A) 301 but no any managed nodes) is described.

Because the wireless network includes the network management node (A) 301 but no any managed nodes, in order to assign an advertisement chance to the network management node (A) 301, an advertisement timeslot and a receiving timeslot are assigned to the network management node (A) 301. The total number of available channels is four, for example but the application is not limited by this.

If the length of the slotframe is 2 (the slotframe including one advertisement timeslot and one receiving timeslot) and the total number of available channels is four, the length of the slotframe is not relatively prime to the total number of available channels, which results a worse channel efficiency. The channel hopping principle is described to explain this.

Referring to Table 1, a channel-hopping table is illustrated. Table 1 is for explanation. The channel-hopping table may be modified based on physical situation.

TABLE 1

| Index | Selected Channel |
| --- | --- |
| 0 | Ch 0 |
| 1 | Ch 1 |
| 2 | Ch 2 |
| 3 | Ch 3 |

The index parameter "Index" may be expressed as:

Index=(ASN+offset) % Nc

Wherein "ASN" represents a timeslot number; "offset" represents a channel offset (CH-OFFSET); "Nc" represents a total quantity of the channels used in the wireless network; mathematic operator "%" represents a modulus operator. After the index parameter "Index" is obtained, the selected channel may be found from Table 1.

When the network management node (A) 301 advertises in the $1^{st}$ advertising timeslot A>* (the timeslot 0 which corresponds to the channel offset 0), the index parameter is Index=(0+0)% 16=0% 16=0. "Index" 0 means that the channel Ch 0 is selected. That is, in timeslot 0, the network management node (A) 301 advertises the $1^{st}$ advertising timeslot A>*(the timeslot 0) through the channel Ch 0. In timeslot 1, the network management node (A) 301 listens through the channel Ch 1 to check whether there are any responses from the nodes. Similarly, in timeslot 2, the network management node (A) 301 switches to channel Ch 2 to advertise. When in timeslot 3, the network management node (A) 301 listens through the channel Ch 3 to check whether there are any responses from the nodes.

FIG. 4A shows the situation that the length of the slotframe is not relatively prime to a total number of available channels. FIG. 4B shows the situation that the length of the slotframe is relatively prime to a total number of available channels.

As shown in FIG. 4A, as for the slotframe 0 (SF0), the first timeslot (timeslot 0) and the second timeslot (timeslot 1) correspond to channel 0 and channel 1, respectively. As for the slotframe 1 (SF1), the first timeslot (timeslot 2) and the second timeslot (timeslot 3) correspond to channel 2 and channel 3, respectively. As for the slotframe 2 (SF2), the first timeslot (timeslot 4 ) and the second timeslot (timeslot 5) correspond to channel 0 and channel 1, respectively. As for the slotframe 3 (SF3), the first timeslot (timeslot 6) and the second timeslot (timeslot 7) correspond to channel 2 and channel 3, respectively.

If the length of the slotframe is not relatively prime to the total number of available channels, the timeslot on the same position (for example, the first timeslot) of the slotframes are assigned by the fixed channels (ch 0 and ch 2). If the advertisement timeslot is assigned at the first timeslot of each slotframe, the advertisement message will be sent via the channel 0 or channel 2 (which implies that the advertisement message is not sent via the channel 1 and channel 3). Thus, if the node listens for the advertisement message via the channel 0 and/or channel 2, the node may receive the advertisement message. However, if the node listens for the advertisement message via the channel 1 and/or channel 3, the node does not receive the advertisement message.

On the contrary, if the length of the slotframe is relatively prime to the total number of available channels, the above problem may be addressed.

As shown in FIG. 4B, the length of the slotframe (which is 3) is relatively prime to the total number of available channels (which is 4). As for the slotframe 0 (SF0), the first timeslot (timeslot 0), the second timeslot (timeslot 1) and the third timeslot (timeslot 2) correspond to channel 0, channel 1 and channel 2, respectively. As for the slotframe 1 (SF1), the first timeslot (timeslot 3), the second timeslot (timeslot 4) and the third timeslot (timeslot 5) correspond to channel 3, channel 0 and channel 1, respectively. As for the slotframe 2 (SF2), the first timeslot (timeslot 6), the second timeslot (timeslot 7) and the third timeslot (timeslot 8) correspond to channel 2, channel 3 and channel 0, respectively. As for the slotframe 3 (SF3), the first timeslot (timeslot 9), the second timeslot (timeslot 10) and the third timeslot (timeslot 11) correspond to channel 1, channel 2 and channel 3, respectively.

Thus, if the length of the slotframe is relatively prime to the total number of available channels, each of the available channels will be possibly used to send the advertisement message. In details, as for the different slotframes, the timeslot on the same position (for example, the first timeslot of each different slotframe) are assigned at each of the available channels (ch 0-ch 3). In other words, if the advertisement timeslot is assigned at the first timeslot of each slotframe, the advertisement message will be sent via channel 0 (as for the slotframe SF0), channel 3 (as for the slotframe SF1), channel 2 (as for the slotframe SF2) and channel 1 (as for the slotframe SF3). Thus, no matter the node requesting to join the wireless network listens on which of the four channels (ch 0-ch 3), the node will have a chance to receive the advertisement message.

Therefore, in the embodiment of the application, if the length of the slotframe is not relatively prime to the total number of available channels, a blank timeslot is additionally added into the slotframe (that is, to adjust the length of the slotframe) step by step to check whether the adjusted length of the slotframe is relatively prime to the total number of available channels or not. If the adjusted length of the slotframe is still not relatively prime to the total number of available channels, another blank timeslot is added to the slotframe until the adjusted length of the slotframe is relatively prime to the total number of available channels. Of course, in other possible embodiment of the application, one or more blank timeslots may be additionally added into the slotframe step by step, which is still within the scope and the spirit of the application.

FIG. 5 shows a slotframe after length adjustment according to an embodiment of the present disclosure. Refer to FIG. 3 and FIG. 5. It is assumed that the wireless network currently includes the network management node (A) 301, the managed nodes (B)-(D) 302-304, and the total number of the available channels is 16. After slotframe length adjustment, the slotframe includes 9 timeslots (9 being relatively prime to 16). The channel hopping table in this example is as following table 2.

TABLE 2

| Index | selected channel |
|---|---|
| 0 | Ch 5 |
| 1 | Ch 0 |
| 2 | Ch 3 |
| 3 | Ch 11 |
| 4 | Ch 15 |
| 5 | Ch 10 |
| 6 | Ch 6 |
| 7 | Ch 9 |
| 8 | Ch 7 |
| 9 | Ch 12 |
| 10 | Ch 4 |
| 11 | Ch 8 |
| 12 | Ch 2 |
| 13 | Ch 13 |
| 14 | Ch 14 |
| 15 | Ch 1 |

Among these 9 timeslots, the timeslots 0 and 1 are assigned as the advertisement timeslot (A>ADV) and the receiving timeslot (A RX) for the network management node (A) 301; the timeslots 2 and 3 are assigned as the advertisement timeslot (B>ADV) and the receiving timeslot (B RX) for the managed node (B) 302. During the timeslot 4, the managed node (B) 302, which is assigned by the channel offset 0, sends its own data to the network management node (A) 301 via channel 15 (B>A); and the managed node (D) 304, which is assigned by the channel offset 2, advertises the advertisement message via channel 6 (D>ADV). During the timeslot 5, the managed node (C) 303, which is assigned by the channel offset 0, sends its own data to the managed node (B) via channel 10 (C>B); and the managed node (D) 304, which is assigned by the channel offset 2, receives via channel 9 (D RX).

During the timeslot 6, the managed node (B) 302 sends data from the managed node (C) 303 to the network management node (A) 301 via channel 15 (B>A). During the timeslot 7, the managed node (D) 304 sends its own data to the network management node (A) 301 via channel 15 (D>A). The timeslot 8 is a blank timeslot. As described above, after the blank timeslot 8 is additionally added, the length of the slotframe is relatively prime to the total number of the available channels.

Besides, as for the initial status of the wireless network (that is, the wireless network includes the network management node, but no any managed nodes), in average, the first node is added after waiting about 24 timeslots. In best situation, the first node is added after waiting 3 timeslots (one slotframe). That is because if the channel used by the first node is the same as the channel used by the network management node to advertise the first advertisement message, the first node receives the advertisement message at the timeslot 0 and sends out the join request at the timeslot 1. In worst situation, the first node is added after waiting 48 timeslots (i.e. 16 slotframes). That is because if the channel used by the first node is the same as the channel used by the network management node to advertise the sixteenth advertisement message, the first node receives the advertisement message at the timeslot 45 and sends out the join request at the timeslot 46 (the timeslot 47 being a blank timeslot).

From the above embodiment of the application, the wireless network is formed by TSCH. For improving channel hopping efficiency, the length of the slotframe is dynamically adjusted to be relatively prime to the total number of the available channels. The above embodiment of the application adjusts the length of the slotframe to improve the efficiency of joining the nodes into the wireless network. Therefore, the wireless network is rapidly formed. If the length of the slotframe is dynamically adjusted based on the advertisement requirement and/or the data transmission requirement, in average, the nodes may join the wireless network in short waiting time. The power consumption of the node is also reduced.

Further, in the embodiment of the application, because the channel hopping efficiency, the advertisement requirement and/or the data transmission requirement are considered, the length of the slotframe may be minimum. Therefore, the timeslot waste is prevented and the timeslot usage efficiency is improved.

Further, in the embodiment of the application, if a new node is joined, the advertisement timeslot, the receiving timeslot and the data timeslot may be assigned for the new node. Because of the dynamic adjustment of the slotframe length, the node join adaption is improved.

In the embodiment of the application, if a new node joins into the wireless network, or an existing managed node is withdrawn from the wireless network, or the advertisement requirement and/or the data transmission requirement are changed, the network management node updates and advertises the timeslot assignment of the slotframe. Alternatively, after a time interval, the network management node may consider the wireless network status to decide whether to update the timeslot assignment. In an embodiment of the present disclosure, the withdrawal of the existing managed node from the wireless network refers to the situation that the node sends a "network withdraw request" to the network management node in the data timeslot, or the situation that the network management node finds out that after a time interval, the node does not transmit data according to the assigned data timeslot. If any of the above situations happens, the network management node may withdraw the existing managed node from the wireless network. After withdrawing the node, the network management node may update and advertise the timeslot assignment according to the above principles.

Further, in the embodiment of the application, the interval sequence in the slotframe is for example but not limited by, the advertisement interval, the data interval and the blank interval. In other possible embodiment of the application, the interval sequence of the advertisement interval, the data interval and the blank interval may be changed. For example, the advertisement interval may be assigned after the data interval. Alternatively, the three intervals may be interlaced.

Further, in the slotframe, if no data transmission requirement, then the data interval is not assigned. In the embodiment of the application, the blank timeslot (i.e. the blank interval) is optional. That is, if the total length of the advertisement interval and the data interval (if any) is relatively prime to the total number of the available channels, then there is not necessary to add the blank timeslot (blank interval) into the slotframe.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wireless network management method for a wireless network, the wireless network management method including:
    evaluating a length parameter of a slotframe by considering an advertisement requirement and/or a data transmission requirement of the wireless network;
    adjusting the length parameter of the slotframe to be relatively prime to a total number of available channels, including adding a blank timeslot into the slotframe step by step, until the length parameter of the slotframe is relatively prime to the total number of available channels; and
    assigning at least one timeslot within the slotframe for matching the advertisement requirement and/or the data transmission requirement, and advertising a timeslot assignment of the slotframe.

2. The wireless network management method according to claim 1, wherein the length parameter of the slotframe includes a number of the timeslot(s) of the slotframe.

3. The wireless network management method according to claim 1, wherein the step of considering the advertisement requirement and/or the data transmission requirement of the wireless network includes:
    assigning at least one advertisement timeslot for a network management node and all managed nodes joined into the wireless network, respectively.

4. The wireless network management method according to claim 1, wherein the step of considering the advertisement requirement and/or the data transmission requirement of the wireless network includes:
    calculating respective data transmission requirement of each managed node based on respective data send from respective managed node.

5. The wireless network management method according to claim 1, wherein the step of assigning the least one timeslot within the slotframe includes:
    deciding that which of the timeslots within the slotframe is assigned for advertising, which of the timeslots within the slotframe is assigned for receiving, which of the timeslots within the slotframe is assigned for data transmission, and which of the timeslots within the slotframe is assigned for being blank, if necessary.

6. The wireless network management method according to claim 1, wherein in the slotframe, an advertisement interval, a data interval and/or a blank interval are interlaced.

7. The wireless network management method according to claim 1, wherein if the advertisement requirement and/or the data transmission requirement are changed, or a new managed node joins into the wireless network or an existing managed node is withdrawn from the wireless network, the timeslot assignment of the slotframe is updated and advertised.

8. A network management node for a wireless network, the network management node including:
    a timeslot requirement calculation sub-module, for evaluating a length parameter of a slotframe by considering an advertisement requirement and/or a data transmission requirement of the wireless network;
    a slotframe length adjustment sub-module, for adjusting the length parameter of the slotframe to be relatively prime to a total number of available channels, wherein the slotframe length adjustment sub-module adds a blank timeslot into the slotframe step by step, until the length parameter of the slotframe is relatively prime to the total number of available channels;
    a timeslot assignment sub-module, for assigning at least one timeslot within the slotframe for matching the advertisement requirement and/or the data transmission requirement, and advertising a timeslot assignment of the slotframe; and
    wherein the timeslot requirement calculation sub-module, the slotframe length adjustment sub-module, and the timeslot assignment sub-module are implemented by a processor.

9. The network management node according to claim 8, wherein the length parameter of the slotframe includes a number of the timeslot(s) of the slotframe.

10. The network management node according to claim 8, wherein the timeslot requirement calculation sub-module assigns at least one advertisement timeslot for a network management node and all managed nodes joined into the wireless network, respectively.

11. The network management node according to claim 8, wherein the timeslot requirement calculation sub-module calculates respective data transmission requirement of each managed node based on respective data send from respective managed node.

12. The network management node according to claim 8, wherein the timeslot assignment sub-module decides that which of the timeslots within the slotframe is assigned for advertising, which of the timeslots within the slotframe is assigned for receiving, which of the timeslots within the slotframe is assigned for data transmission, and which of the timeslots within the slotframe is assigned for being blank, if necessary.

13. The network management node according to claim 8, wherein in the slotframe, an advertisement interval, a data interval and/or a blank interval are interlaced.

14. The network management node according to claim 8, wherein if the advertisement requirement and/or the data transmission requirement are changed, or a new managed node joins into the wireless network or an existing managed node is withdrawn from the wireless network, the timeslot assignment sub-module updates and advertises the timeslot assignment of the slotframe.

\* \* \* \* \*